United States Patent
Codavalli

(10) Patent No.: US 9,621,667 B2
(45) Date of Patent: Apr. 11, 2017

(54) STREAMING MEDIA WITH A SERVER IDENTIFIED AT RUNTIME

(75) Inventor: Rajnikanth Codavalli, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 687 days.

(21) Appl. No.: 13/595,878

(22) Filed: Aug. 27, 2012

(65) Prior Publication Data

US 2014/0059245 A1 Feb. 27, 2014

(51) Int. Cl.
*H04L 29/08* (2006.01)
*H04L 29/06* (2006.01)

(52) U.S. Cl.
CPC .... *H04L 67/2842* (2013.01); *H04L 29/06476* (2013.01); *H04L 65/4084* (2013.01); *H04L 65/60* (2013.01)

(58) Field of Classification Search
CPC ..... H04L 65/60; H04L 65/4084; H04L 12/14; H04L 12/2803; H04L 63/029; H04L 67/02; H04L 29/06–29/06027; H04L 29/06448–29/06517; H04L 67/1002; G06F 15/16; G06F 17/30017–17/30887; H04N 7/17318–7/181; H04N 21/239
USPC ......... 709/202–203, 219, 231; 370/246, 338, 370/401
See application file for complete search history.

(56) References Cited

U.S. PATENT DOCUMENTS

| | | | | |
|---|---|---|---|---|
| 7,782,363 | B2 * | 8/2010 | Ortiz ..................... | H04N 5/232 348/157 |
| 2001/0018701 | A1 * | 8/2001 | LiVecchi ............... | G06F 9/4881 718/105 |
| 2002/0104022 | A1 * | 8/2002 | Jorgenson ............... | H04L 29/06 726/12 |
| 2004/0236844 | A1 * | 11/2004 | Kocherlakota .... | H04N 7/17318 709/219 |
| 2005/0028225 | A1 * | 2/2005 | Dawson ............... | H04N 21/239 725/146 |
| 2008/0162495 | A1 * | 7/2008 | Chu .................... | H04N 7/17318 |

(Continued)

OTHER PUBLICATIONS

"Adobe® Connect™ Enterprise Technical Overview" published in 2007.*

*Primary Examiner* — Wing F Chan
*Assistant Examiner* — Raji Krishnan
(74) *Attorney, Agent, or Firm* — Shook, Hardy & Bacon L.L.P.

(57) ABSTRACT

A server machine may create a network connection to a device and receive a request to stream media that is managed by a different server machine. The server machine that created the network connection may be unaware of the location of the media at the time the network connection is created, and the location of the media may remain unknown to this server machine until the location is identified by the request, which may be received at runtime. In response to this request, the server machine that created the network connection may communicate with the different server machine and function as an intermediary in routing a stream of data between the device and the different server machine. In example embodiments where certain media is managed by the other server machine, the server machine may retrieve the media and stream it to the device using the created network connection.

13 Claims, 9 Drawing Sheets

(56) References Cited

U.S. PATENT DOCUMENTS

| | | | |
|---|---|---|---|
| 2008/0201451 A1* | 8/2008 | Yu | H04L 29/06 709/219 |
| 2010/0081116 A1* | 4/2010 | Barasch | A63B 24/0003 434/252 |
| 2011/0090801 A1* | 4/2011 | Oku | H04L 12/14 370/246 |
| 2011/0119325 A1* | 5/2011 | Paul | H04L 67/1002 709/203 |
| 2011/0119716 A1* | 5/2011 | Coleman, Sr. | H04N 7/181 725/62 |
| 2011/0191445 A1* | 8/2011 | Dazzi | G06F 15/16 709/219 |
| 2012/0072525 A1* | 3/2012 | Yevmenkin | H04L 29/08729 709/213 |
| 2013/0097239 A1* | 4/2013 | Brown | H04L 67/02 709/204 |
| 2014/0032680 A1* | 1/2014 | Palli | H04L 51/10 709/206 |
| 2014/0059245 A1* | 2/2014 | Codavalli | H04L 65/60 709/231 |

\* cited by examiner

STREAMING MEDIA WITH A SERVER IDENTIFIED AT RUNTIME

TECHNICAL FIELD

The subject matter disclosed herein generally relates to the processing of data. Specifically, the present disclosure addresses systems and methods of providing media with a server identified at runtime.

BACKGROUND

Streaming media may be provided by a server (e.g., a media server machine) to a client (e.g., client device). For example, various media streaming websites (e.g., You-Tube®) provide one or more media streaming services that allow a client to request and receive media (e.g., all or part of a video file, audio file, a text file, data file, or any suitable combination thereof) as a stream of data that can be presented (e.g., played) by the client (e.g., within a browser application or a media player application). Streaming the media in a manner that allows it to be presented while still being streamed is distinguishable from providing the media as a data file (e.g., an entire video file, audio file, or any suitable combination thereof) that cannot be presented until the file is fully downloaded by the client.

BRIEF DESCRIPTION OF THE DRAWINGS

Some embodiments are illustrated by way of example and not limitation in the figures of the accompanying drawings.

DETAILED DESCRIPTION

Figure 1:
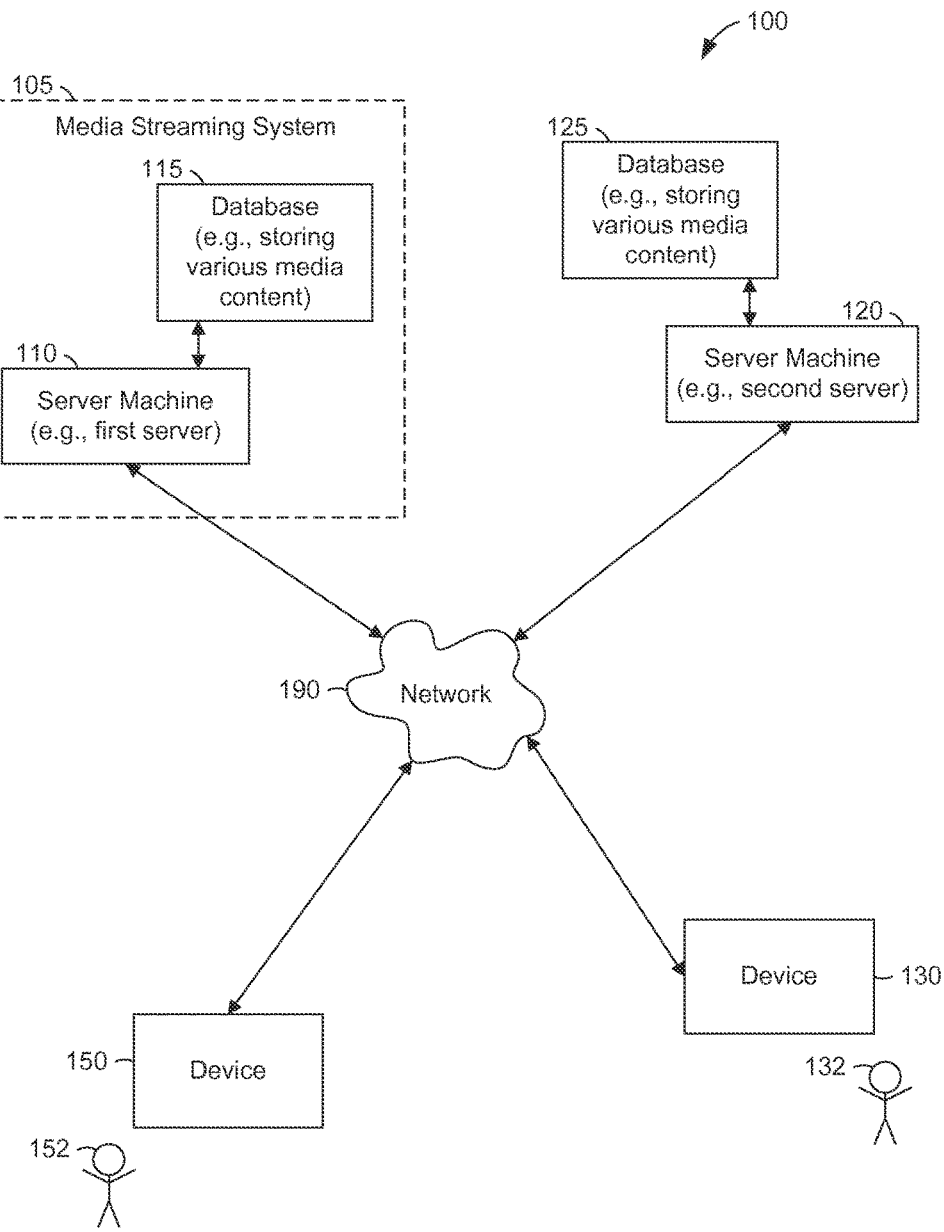
FIG. 1 is a network diagram illustrating a network environment suitable for streaming media with a server identified at runtime (e.g., at play time, at a start of streaming, at a start of a download, or at a start of an upload), according to some example embodiments.

Example methods and systems are directed to streaming media with (e.g., to, from, using, or any suitable combination thereof) a server that is identified at runtime (e.g., at play time, at the start of streaming, at the start of a download, at the start of an upload, or any suitable combination thereof). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A server machine within a media streaming system may manage a database that stores various media content, and in response to a request (e.g., a connection request) from a device, the server machine may create a network connection (e.g., initiate a communication session that is configured for media streaming) between the server machine and the device. The server machine may then use the created network connection (e.g., the initiated communication session) to stream some or all of the media content to the device. Media streaming, as used herein, refers to communication of media in portions (e.g., frames) that are presentable (e.g., playable) in real-time or near-real-time. The streaming may operate in upstream or downstream directions (e.g., to the device or from the device). In response to a request (e.g., a connection request) from the device, the server machine may create a network connection and allow the device to stream some media content to the server, via the created network connection, for storage in the database managed by the server.

In some situations, after the network connection is created between the server machine and the device, it may be helpful to use the existing (e.g., pre-existing) network connection for streaming different media content that is stored elsewhere (e.g., on a different server machine, in a different database managed by a different server machine, on the device, or in a different database managed by the device). Accordingly, the server machine that created the network connection may be configured (e.g., by one or more modules that include software, hardware, or both) to receive a request to stream media content that is stored elsewhere. Such a request may be denoted as a "stream request," and this stream request may be received from the device, for example. Moreover, the stream request may identify where the media content is stored. Accordingly, where the requested media content is stored may be unknown (e.g., unidentified) to the server machine that created the network connection until the stream request is received. The server machine that created the network connection may be unaware of the location of the media content at the time the network connection is created, and the location of the media content may remain unknown to this server machine until the location is identified by the stream request, which is received at runtime (e.g., at play time of the media, at the start of the streaming of the media, at the start of a download of all or part of the media, or at the start of an upload of all or part of the media).

In response to the stream request, the server machine that created the network connection may communicate with (e.g., access) a further server machine, which may manage different media content stored in a different database. The server machine that created the network connection may be a "first server machine," and the further server machine that manages the different media content may be a "second server machine." In example embodiments where the different media content is managed (e.g., stored) by the second server machine, the first server machine may access the second server machine, retrieve at least a portion of the different media content from the second server machine, and stream at least the portion of the different media content to the device (e.g., via the created network connection). In example embodiments where the different media content is managed by the device, the first server machine may access the device, initiate a data stream with at least a portion of the different media content from the device to the first server machine (e.g., via the created network connection), and provide the data stream to the second server machine (e.g., for storage).

Accordingly, the first server machine may create the network connection for media streaming, and the second server machine may provide or receive the media content via the network connection created by the first server machine. This may have the effect of enabling the first server machine to stream various media content stored elsewhere (e.g., at the second server machine). This may also have the effect of enabling the second server machine to provide media content to various devices without implementing a streaming engine capable of creating network connections suitable for media streaming. Furthermore, this may have the effect of enabling a device to request and use a single network connection to the first server machine, and then request and receive various media content from multiple sources (e.g., the second server machine) over the single network connection, and these multiple sources may remain unidentified to the first server machine until media content from these sources is requested by the device (e.g., at runtime).

FIG. 1 is a network diagram illustrating a network environment 100 suitable for streaming media with a server identified at runtime, according to some example embodiments. The network environment 100 includes a server machine 110 (e.g., a first server or a first server machine), another server machine 120 (e.g., a second server or a second server machine), and devices 130 and 150 (e.g., client devices), all communicatively coupled to each other via a network 190.

A database 115 (e.g., a first database) is communicatively coupled to the server machine 110, and another database 125 (e.g., a second database) is communicatively coupled to the server machine 120. In some example embodiments, one or more of the databases 115 and 125 is connected directly to the network 190. The database 115 may store various media content, and the media content stored by the database 115 may be managed (e.g., maintained) by the server machine 110. Likewise, the database 125 may store different media content (e.g., media content distinct from that stored by the database 115), and the different media content stored by the database 125 may be managed by the server machine 120. Moreover, one or more of the devices 130 and 150 may store or manage further media content (e.g., media content distinct from that stored by the database 115 or the database 125). For example, the device 130 may have a camera, and the device 130 may store a video captured by that camera.

As shown, the server machine 110, the database 115, or both, may form all or part of a media streaming system 105. Similarly, the server machine 120, the database 125, or both, may form all or part of another media streaming system, though such example embodiments are not shown in FIG. 1. One or more of the server machines 110 and 120, the databases 115 and 125, and the devices 130 and 150 may be implemented in a computer system, in whole or in part, as described below with respect to FIG. 9.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines illustrated in FIG. 1 may be combined into a single machine, and the functions described herein for any single machine may be subdivided among multiple machines.

The network 190 may be any network that enables communication between machines (e.g., server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
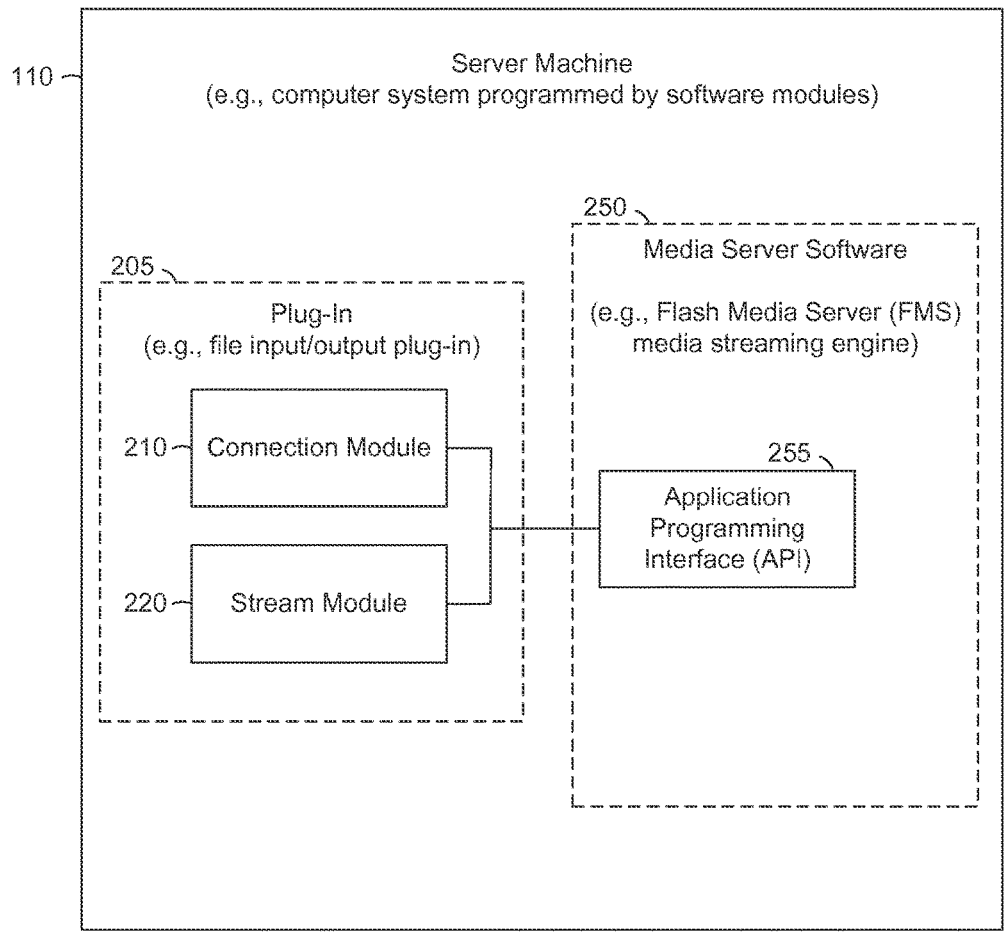
FIG. 2 is a block diagram illustrating components of a server machine suitable for streaming media with another server machine (e.g., a further server machine) being identified at runtime, according to some example embodiments.

FIG. 2 is a block diagram illustrating components of the server machine 110 that configure the server machine 110 to stream media (e.g., media content) with the server machine 120, which may be identified at runtime, according to some example embodiments. The server machine 110 may include media server software 250. For example, the media server software 250 may be or include a media streaming engine (e.g., Flash Media Server (FMS) by Adobe®). As noted above, such a media streaming engine may be absent from the server machine 120 (e.g., second server). The media server software 250 may include an application programming interface (API) 255.

The server machine 110 may further include a plug-in 205 that is configured to interface with the media server software 250 (e.g., via the API 255). For example, the plug-in 205 may be an input/output (I/O) plug-in (e.g., a file I/O plug-in) that modifies or updates the behavior (e.g., default behavior) of the media server software 250. As shown in FIG. 2, the plug-in 205 includes a connection module 210 and a stream module 220. Functionality of the connection module 210 and the stream module 220, according to various example embodiments, is discussed below. Any one or more of the modules shown in FIG. 2 may be configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules.

Figure 3:
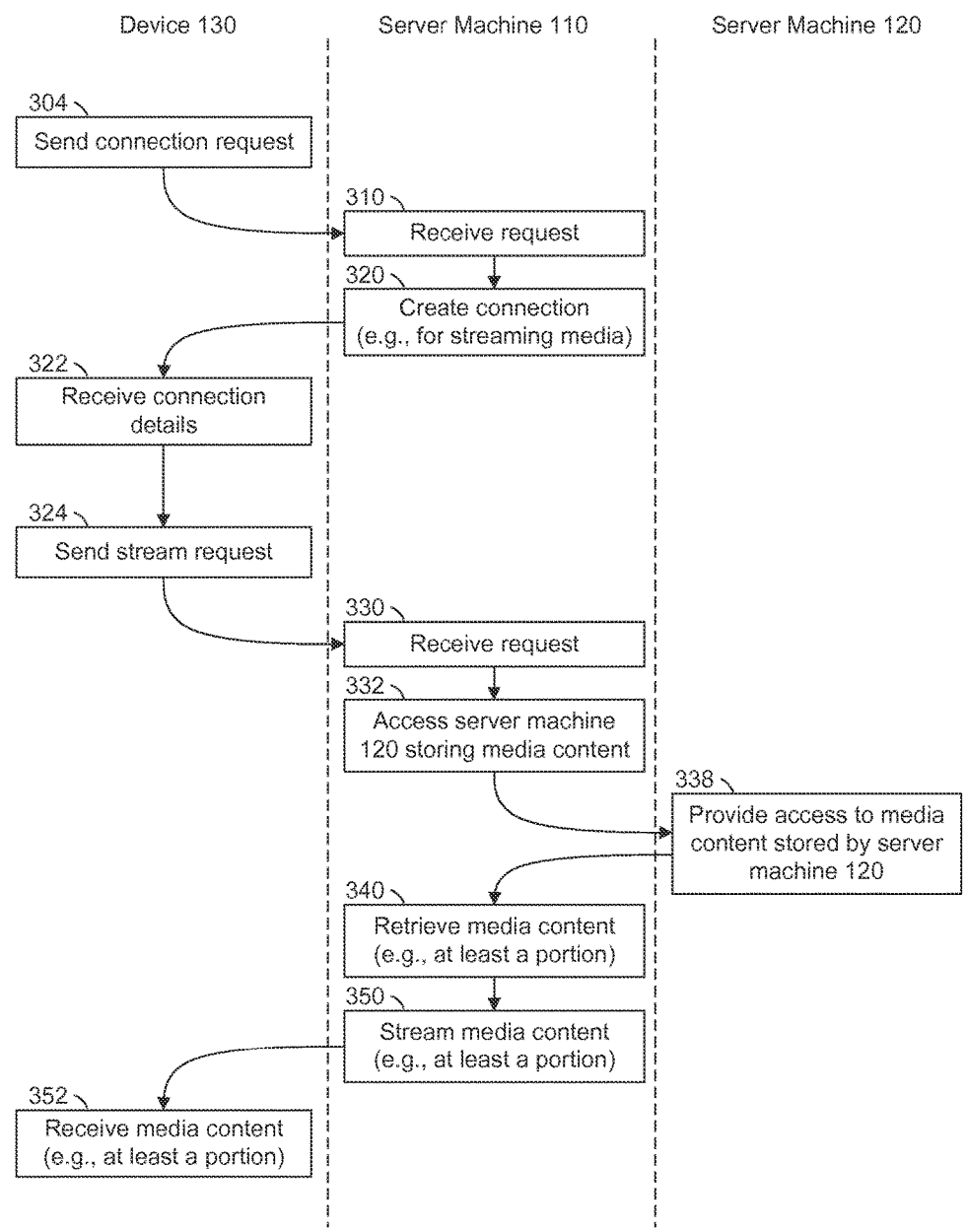
FIG. 3 is a flowchart illustrating data flows among a device (e.g., a client device), the server machine (e.g., a first server machine), and a further server machine (e.g., a second server machine) in providing media from the further server machine to the device, which may be identified at runtime, according to some example embodiments.

FIG. 3 is a flowchart illustrating data flows among the device 130, the server machine 110 (e.g., the first server machine or the first server), and the server machine 120 (e.g., the second server machine or the second server) in identifying the server machine 120 at runtime and streaming media from the server machine 120 to the device 130, according to some example embodiments. In operation 304, the device 130 sends a connection request to the server machine 110. The connection request may request creation of a network connection (e.g., a communication session configured for streaming of media) between the device 130 and the server machine 110. Moreover, the server machine 110 may be identified in the connection request (e.g., as the creator of the network connection, a provider of a media streaming service, or both). Furthermore, the server machine 120 may be unmentioned in the connection request, and the connection request may be devoid of any reference to the server machine 120.

In operation 310, the server machine 110 receives the connection request sent in operation 304. In operation 320, the server machine 110 creates the network connection that was requested in the request received in operation 310. The created network connection may support one or more suitable protocols for communication of data, including media streaming, file transfer protocol (FTP), hypertext transfer protocol (HTTP), or any suitable combination thereof. In some example embodiments, the server machine 110 creates the network connection by creating or initiating a communication session configured for media streaming. Creation of the network connection may be in response to the connection request received in operation 310. The created network connection may be between the device 130 and the server machine 110. As shown in FIG. 3, creation of the network connection may provide connection details (e.g., detailed information about the created network connection) to the device 130.

In operation 322, the device 130 receives the connection details regarding the network connection created in operation 320. At this point, the network connection may be used to stream various media (e.g., media content) managed by (e.g., stored by) the server machine 110 from the server machine 110 to the client device 130. Thus far in the data flows shown in FIG. 3, the server machine 120 has not been identified to the server machine 110, and the server machine 110 may be unaware of (e.g., devoid of information that identifies) the server machine 120.

In operation 324, the device 130 sends a stream request to the server machine 110. The stream request may request that the server machine 110 (e.g., the first server) provide the device 130 with media (e.g., media content) managed by (e.g., stored by) the server machine 120 (e.g., the second server). The media requested by the stream request may be absent from the server machine 110 (e.g., absent from both the server machine 110 and the database 115). Moreover, the server machine 120 (e.g., the second server) may be identified in the stream request (e.g., as a location of the media requested in the stream request). Furthermore, the server machine 110 (e.g., the first server) may be unmentioned in the stream request, and the stream request may be devoid of any reference to the server machine 110. Operation 324 may be performed at runtime (e.g., at play time or presentation time), in the sense that the stream request may be a request for immediate (e.g., on demand) streaming of the media to the device 130.

In operation 330, the server machine 110 receives the stream request sent in operation 324. At this point in the data flows shown in FIG. 3, the server machine 120 may be identified (e.g., for the first time since the creation of the network connection in operation 320) to the server machine 110, and the server machine 110 may become aware of (e.g., influenced by information that identifies) the server machine 120 (e.g., for the first time since the creation of the network connection in operation 320).

In operation 332, the server machine 110 accesses the server machine 120, which manages (e.g., stores) the media requested in the stream request received in operation 330. For example, the server machine 110 may open a further network connection (e.g., configured for media streaming or not) between the server machine 110 and the server machine 120. In operation 338, the server machine 120 provides the server machine 110 with access (e.g., via a network connection) to the media that is managed by the server machine 120.

In operation 340, the server machine 110 retrieves at least a portion of the media requested in the stream request, as received in operation 330. Operation 340 may be performed in response to the stream request received in operation 330, using a network connection between the server machine 110 and the server machine 120 (e.g., a network connection opened in operation 332).

In operation 350, the server machine 110 (e.g., the first server) streams the media retrieved in operation 340, or a portion thereof, to the device 130. Operation 350 may be performed in response to the stream request received in operation 330, using the network connection created in operation 320 between the server machine 110 and the device 130. For example, the server machine 110 may generate or initiate a data stream that contains all or part of the media retrieved in operation 340, using the network connection created in operation 320.

In operation 352, the device 130 receives from the server machine 110 all or part of the media requested in the stream request sent in operation 324. Accordingly, the media or any portion thereof may be streamed to the device 130 (e.g., for presentation thereon).

Figure 4:
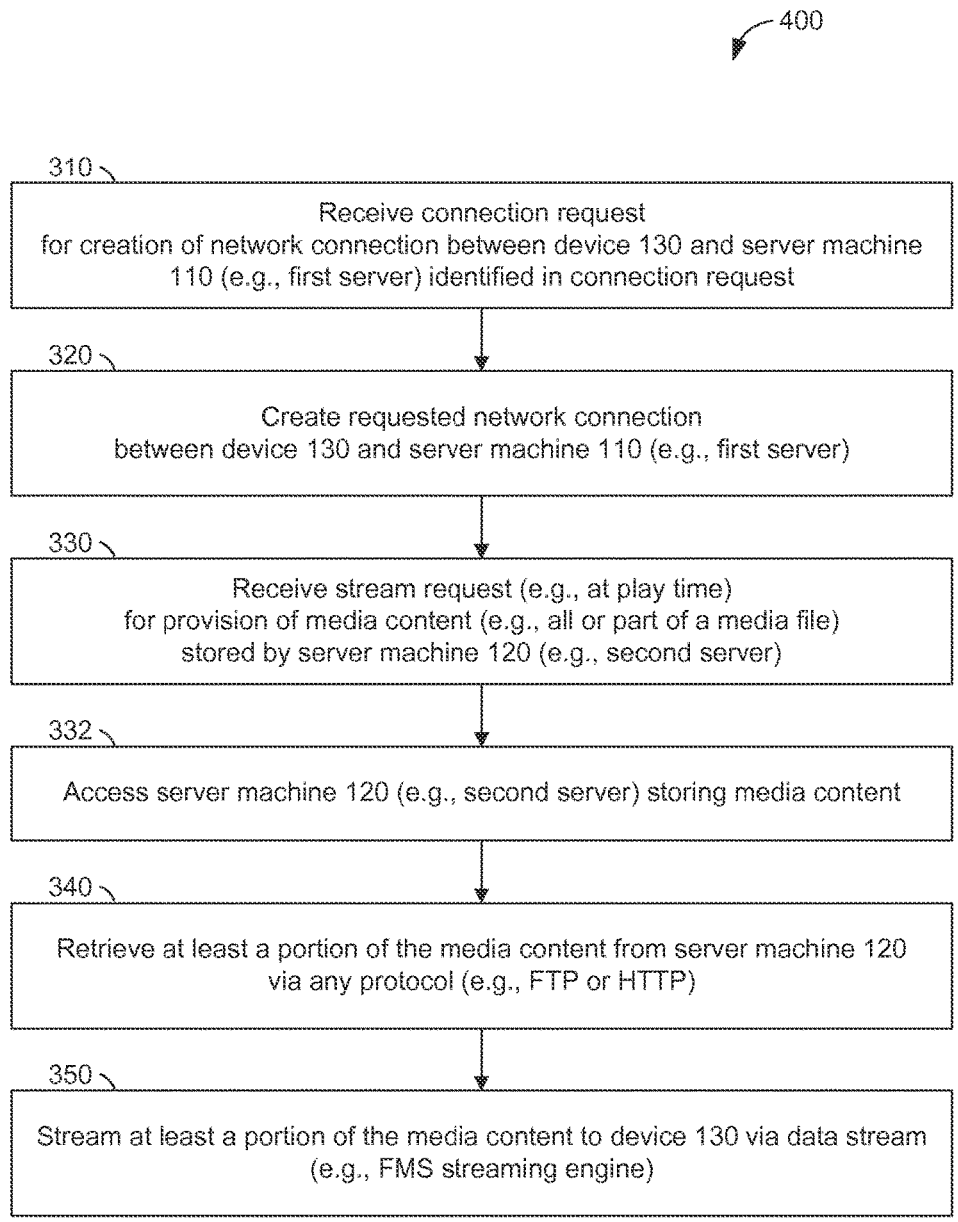
FIG. 4-5 are flowcharts illustrating operations of the server machine in performing a method of providing media from the further server, which may be identified at runtime, according to some example embodiments.
Figure 5:
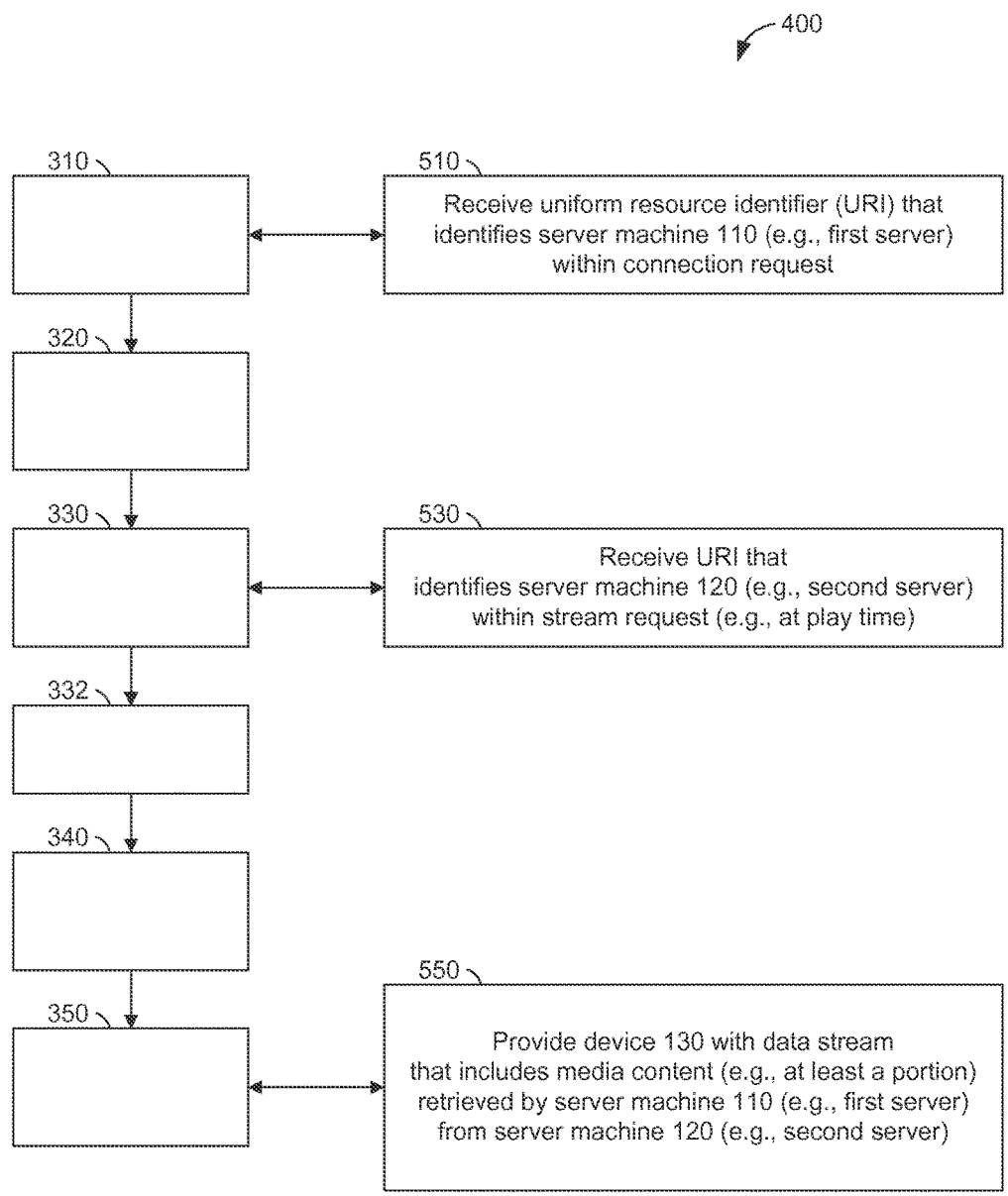

FIG. 4-5 are flowcharts illustrating operations of the server machine 110 (e.g., the first server machine or the first server) in performing a method 400 of identifying the server machine 120 (e.g., the second server machine or the second server) at runtime and providing (e.g., streaming) media from the server machine 120 to the device 130, according to some example embodiments. Operations in the method 400 may be performed by the server machine 110 (e.g., the first server), using modules described above with respect to FIG. 2. As shown, the method 400 includes operations 310, 320, 330, 340, and 350, which are introduced above with respect to FIG. 3. According to some example embodiments, the method 400 may also include operation 332, which is also introduced above with respect to FIG. 3.

In operation 310, the connection module 210 receives the connection request that requests creation of the network connection between the device 130 and the server machine 110 (e.g., the first server machine or the first server). As noted above, the server machine 110 may be identified in the connection request, and the connection request may contain no mention of the server machine 120 (e.g., the second server machine or the second server). Hence, the server machine 120 (e.g., the second server) may be unmentioned in the connection request that identifies the server machine 110 (e.g., the first server).

In operation 320, the connection module 210 creates the network connection requested by the connection request. For example, the connection module 210 may create the network connection between the device 130 and the server machine 110, which may be identified in the connection request. The network connection may be created in response to the receiving of the connection request in operation 310. The created network connection may support one or more suitable protocols for communication of data, including media streaming, FTP, HTTP, or any suitable combination thereof.

In operation 330, the stream module 220 receives the stream request that requests provision of the media managed by the server machine 120 (e.g., the second server machine) from the server machine 110 to the device 130. As noted above, the stream request may identify the server machine 120 to the server machine 110 (e.g., for the first time since the creation of the network connection in operation 320). As noted above, the server machine 120 may be identified in the stream request, and the stream request may contain no mention of the server machine 110. Hence, the server machine 110 (e.g., the first server) may be unmentioned in the stream request that identifies the server machine 120 (e.g., the second server).

In operation 332, the stream module 220 accesses the server machine 120 (e.g., by opening another network connection, which may be configured for streaming media or configured for communicating data other than streaming media). As noted above, the media requested by the stream request received in operation 330 may be managed by the server machine 120 (e.g., stored in the database 125).

In operation 340, the stream module 220 retrieves at least a portion of the media (e.g., media content) that is requested by the stream request. As noted above, operation 340 may be performed in response to the stream request received in operation 330. For example, in response to the stream request, the stream module 220 may retrieve at least the portion of the requested media from the server machine 120, which may be identified in the stream request and unmentioned in the connection request received in operation 310.

In operation 350, the stream module 220 streams the media retrieved in operation 340, or a portion thereof, to the device 130 (e.g., in response to the stream request received in operation 330, or in fulfillment thereof). The streaming of the media, or a portion thereof, may be performed using the network connection created in operation 320 between the device 130 and the server machine 110. For example, the stream module 220 may generate or initiate a data stream that contains all or part of the media retrieved in operation 340, and the stream module 220 may provide this data stream to the device 130 via the network connection created in operation 320.

As shown in FIG. 5, the method 400 may include one or more of operations 510, 530, and 550. Operation 510 may be performed as part (e.g., a precursor task, a subroutine, or a portion) of operation 310, in which the connection module 210 receives the connection request for creation of the network connection between the device 130 and the server machine 110 (e.g., the connection request that identifies the server machine 110 and fails to mention the server machine 120). In operation 510, the connection module 210 receives a uniform resource identifier (URI) that identifies the server machine 110. This URI (e.g., a first URI that identifies the first server) may be received within the connection request discussed above with respect to operation 310. According to some example embodiments, there is no URI within the connection request that identifies the server machine 120.

Operation 530 may be performed as part of operation 330, in which the stream module 220 receives the stream request for streaming of media managed by the server machine 120 (e.g., the stream request that identifies the server machine 120 to the server machine 110). In operation 530, the stream module 220 receives a URI that identifies the server machine 120. This URI (e.g., a second URI that identifies the second server) may be received with the stream request discussed above with respect to operation 330. According to some example embodiments, this URI is provided to the server machine 110 for the first time since the creation of the network connection between the device 130 and the server machine 110 in operation 320. Since the stream request may be received at runtime (e.g., play time), the URI of the server machine 120 may also be received at runtime within the stream request.

Operation 550 may be performed as part of operation 350, in which the stream module 220 streams at least a portion of the media requested in the stream request to the device 130. In operation 550, the stream module 220 provides the device 130 with a data stream that includes some or all of the media retrieved by the stream module 220 in operation 340. As noted above, this media may be retrieved from the server machine 120. As a result, the media requested in the stream request may be streamed to the device 130 via the network connection created in operation 320, without identifying the second server machine 120 until the stream request is received in operation 330.

Figure 6:
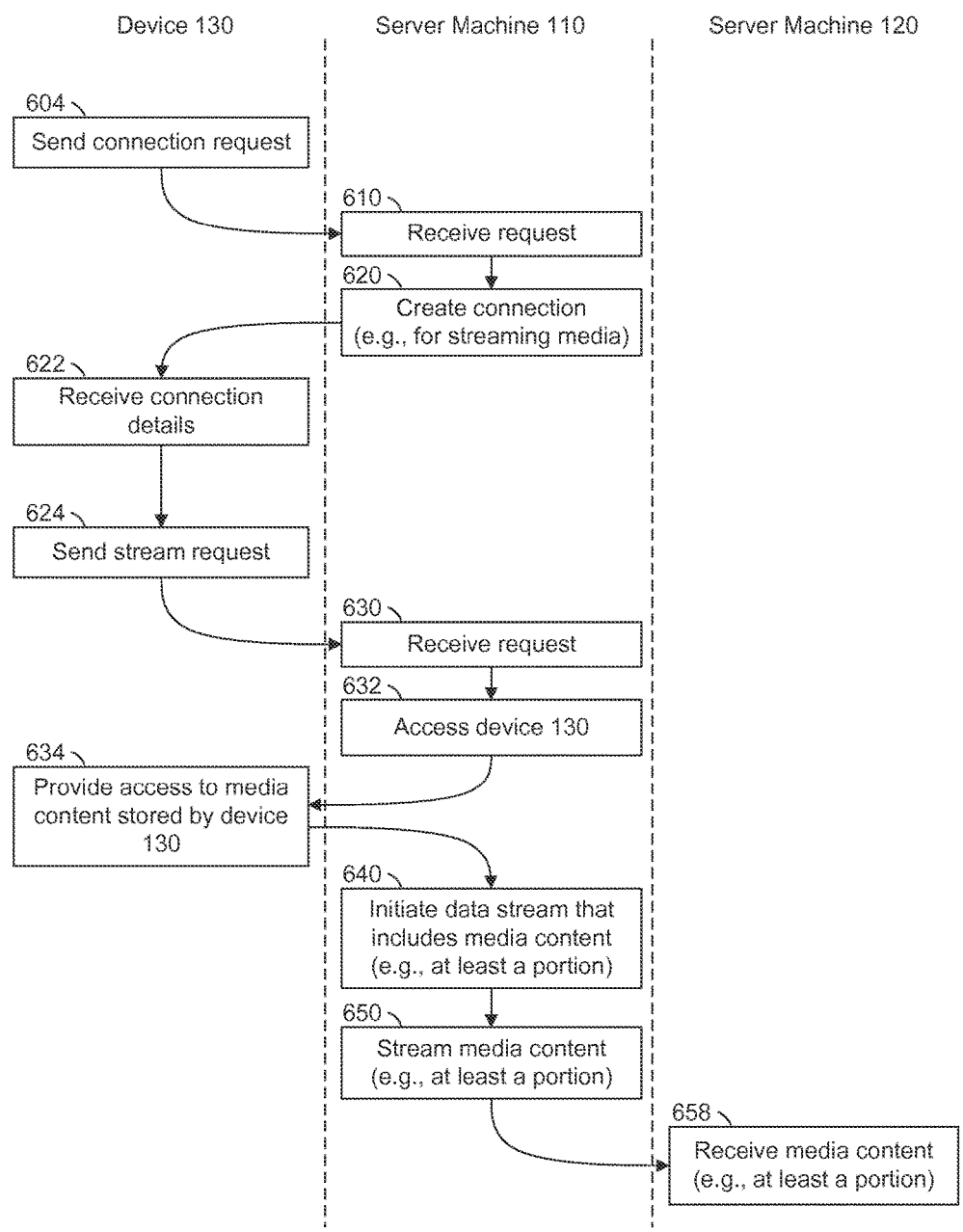
FIG. 6 is a flowchart illustrating data flows among the device, the server machine, and the further server machine in providing media from the device to the further server machine, which may be identified at runtime, according to some example embodiments.

FIG. 6 is a flowchart illustrating data flows among the device 130, the server machine 110 (e.g., the first server machine or the first server), and the server machine 120 (e.g., the second server machine or the second server) in identifying the server machine 120 at runtime and streaming media from the device 130 to the server machine 120, according some example embodiments. In operation 604, the device 130 sends a connection request to the server machine 110. The connection request may request creation of a network connection (e.g., a communication session configured for streaming of media) between the device 130 and the server machine 110. Moreover, the server machine 110 may be identified in the connection request (e.g., as the creator of the network connection, a provider of a media uploading service, or both). Furthermore, the server machine 120 may be unmentioned in the connection request, and the connection request may be devoid of any reference to the server machine 120.

In operation 610, the server machine 110 receives the connection request sent in operation 604. In operation 620, the server machine 110 creates the network connection that was requested in the request received in operation 610. The created network connection may support one or more suitable protocols for communication of data, including media streaming, FTP, HTTP, or any suitable combination thereof. In some example embodiments, the server machine 110 creates the network connection by creating or initiating a communication session configured for media streaming. Creation of the network connection may be in response to the connection request received in operation 610. The created network connection may be between the device 130 and the server machine 110. As shown in FIG. 6, creation of the network connection may provide connection details (e.g., detailed information about the created network connection) to the device 130.

In operation 622, the device 130 receives the connection details regarding the network connection created in operation 620. At this point, the network connection may be used to stream various media (e.g., media content) managed by (e.g., stored by) the device 130 from the device 130 to the server machine 110. Thus far in the data flows shown in FIG. 6, the server machine 120 has not been identified to the server machine 110, and the server machine 110 may be unaware of (e.g., devoid of information that identifies) the server machine 120.

In operation 624, the device 130 sends a stream request to the server machine 110. The stream request may request that the server machine 110 (e.g., the first server) provide the server machine 120 (e.g., the second server) with media (e.g., media content) managed by (e.g., stored by) the device 130. The media requested by the stream request may be absent from the server machine 110 (e.g., absent from both the server machine 110 and the database 115), from the server machine 120 (e.g., absent from both the server machine 120 and the database 125), or both. Moreover, the server machine 120 (e.g., the second server) may be identified in the stream request (e.g., as a destination for the media managed by the device 130). Furthermore, the server machine 110 (e.g., the first server) may be unmentioned in the stream request, and the stream request may be devoid of any reference to the server machine 110. Operation 624 may be performed at runtime (e.g., at recording time or upload time), in the sense that the stream request may be a request for immediate (e.g., on demand) streaming of the media to the server machine 120.

In operation 630, the server machine 110 receives the stream request sent in operation 624. At this point in the data flows shown in FIG. 6, the server machine 120 may be identified (e.g., for the first time since the creation of the network connection in operation 620) to the server machine 110, and the server machine 110 may become aware of (e.g., influenced by information that identifies) the server machine 120 (e.g., for the first time since the creation of the network connection in operation 620).

In operation 632, the server machine 110 accesses the device 130, which manages (e.g., stores) the media for which streaming is requested in the stream request received in operation 630. For example, the server machine 110 may access the device via the network connection opened in operation 620. In operation 634, the device 130 provides the server machine 110 with access (e.g., via the network connection created in operation 620) to the media that is managed by the device 130.

In operation 640, the server machine 110 (e.g., the first server) initiates a data stream from the device 130 to the server machine 110 (e.g., the first server). This data stream may include at least a portion of the media for which streaming is requested in the stream request, as received in operation 630. Operation 640 may be performed in response to the stream request received in operation 630, using the network connection between the server machine 110 and the device 130 (e.g., the network connection created in operation 620). For example, the data stream may communicate the media, or any portion thereof, from the device 130 to the server machine 110, via the network connection (e.g., a communication session configured for media streaming) created in operation 620.

In operation 650, the server machine 110 (e.g., the first server) provides the data stream, or a portion thereof, to the server machine 120 (e.g., the second server, for storage in the database 125). Accordingly, the media for which streaming is requested in the streaming request, or a portion thereof, may be provided to the server machine 120 (e.g., the second server) by the server machine 110 (e.g., the first server). Operation 650 may be performed in response to the stream request received in operation 630. In some example embodiments, operation 650 includes opening a further network connection (e.g., configured for media streaming or not) between the server machine 110 and the server machine 120, and this further network connection may be used to stream the media, or any portion thereof, to the server machine 120. For example, the server machine 110 may generate or initiate a further data stream that contains all or part of the media included in the data stream discussed above with respect to operation 640, and this further data stream may be provided to the server machine 120 (e.g., for archiving some or all of the media uploaded from the device 130).

In operation 658, the server machine 120 (e.g., the second server) receives all or part of the media for which streaming is requested in the stream request received in operation 630. Accordingly, the media or any portion thereof may be streamed to the server machine 120 (e.g., for storage in the database 125).

Figure 7:
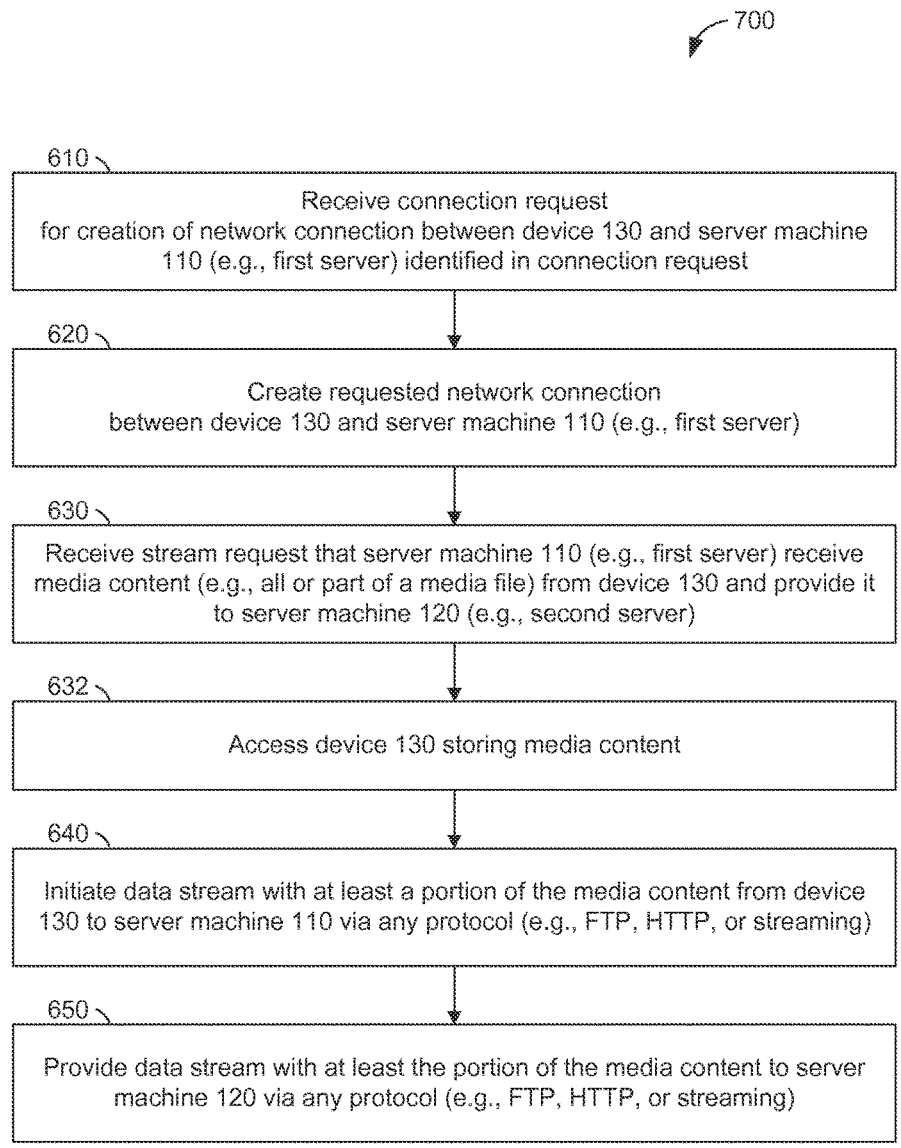
FIG. 7-8 are flowcharts illustrating operations of the server machine in performing a method of providing media to the further server machine, which may be identified at runtime, according to some example embodiments.
Figure 8:
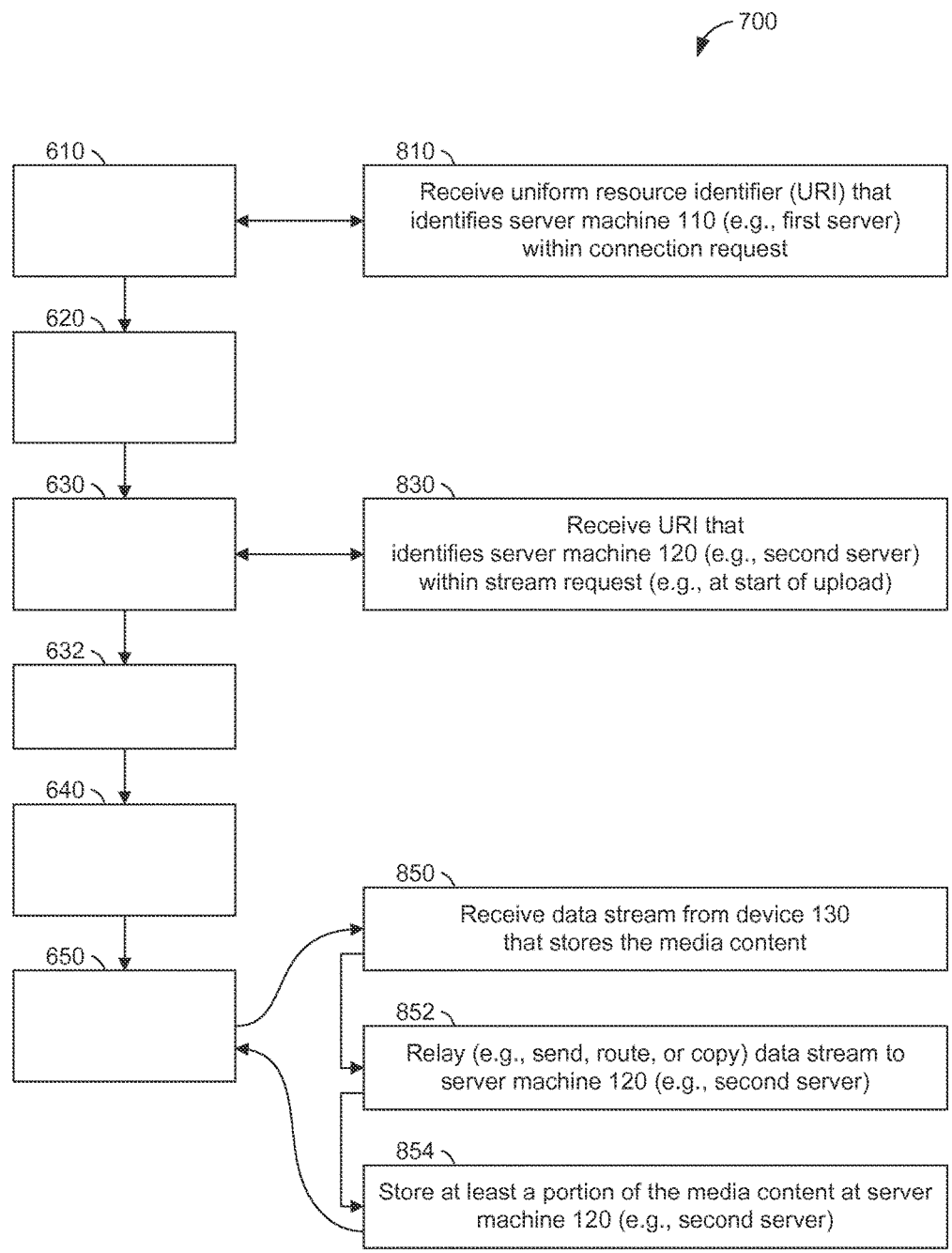

FIG. 7-8 are flowcharts illustrating operations of the server machine 110 (e.g., the first server machine or the first server) in performing a method 700 of identifying the server machine 120 (e.g., the second server machine or the second server) at runtime and providing (e.g., streaming) media to the server machine 120 from the device 130, according to some example embodiments. Operations in the method 700 may be performed by the server machine 110 (e.g., the first server), using modules described above with respect to FIG. 2. As shown, the method 700 includes operations 610, 620, 630, 640, and 650, which are introduced above with respect to FIG. 6. According to some example embodiments, the method 700 may also include operation 632, which is also introduced above with respect to FIG. 6.

In operation 610, the connection module 210 receives the connection request that requests creation of the network connection between the device 130 and the server machine 110 (e.g., the first server machine or the first server). As noted above, the server machine 110 may be identified in the connection request, and the connection request may contain no mention of the server machine 120 (e.g., the second server machine or the second server). Hence, the server machine 120 (e.g., the second server) may be unmentioned in the connection request that identifies the server machine 110 (e.g., the first server).

In operation 620, the connection module 210 creates the network connection requested by the connection request. For example, the connection module 210 may create the network connection between the device 130 and the server machine 110, which may be identified in the connection request. The network connection may be created in response to the receiving of the connection request in operation 610. The created network connection may support one or more suitable protocols for communication of data, including media streaming, FTP, HTTP, or any suitable combination thereof.

In operation 630, the stream module 220 receives the stream request that requests that the server machine 110 (e.g., the first server) provide the server machine 120 (e.g., the second server) with media (e.g., media content) that is managed by (e.g., stored by) the device 130. As noted above, the media for which streaming is requested by the stream request may be absent from the server machine 110 (e.g., absent from both the server machine 110 and the database 115), from the server machine 120 (e.g., absent from both the server machine 120 and the database 125), or both. As previously mentioned, the stream request may identify the server machine 120 to the server machine 110 (e.g., for the first time since the creation of the network connection in operation 620). As also noted above, the server machine 120 may be identified in the stream request, and the stream request may contain no mention of the server machine 110. Hence, the server machine 110 (e.g., the first server) may be unmentioned in the stream request that identifies the server machine 120 (e.g., the second server).

In operation 632, the stream module 220 accesses the device 130 (e.g., via the network connection opened in operation 620). As noted above, the media for which streaming is requested by the stream request received in operation 630 may be managed by the device 130 (e.g., stored by the device 130 or in a database managed by the device 130).

In operation 640, the stream module 220 initiates a data stream from the device 130 to the server machine 110 (e.g., the first server). This data stream may be provided by the device 130 to the server machine 110 via the connection opened in operation 620. Moreover, this data stream may be provided by the device 130 using any suitable protocol (e.g., media streaming, FTP, or HTTP) or combination thereof. As noted above, this data stream may include at least a portion of the media (e.g., media content) for which streaming is requested in the stream request. As noted above, operation 640 may be performed in response to the stream request received in operation 630.

In operation 650, the stream module 220 provides (e.g., streams) some or all the data stream initiated in operation 640 to the server machine 120 (e.g., in response to the stream request received in operation 630, or in fulfillment thereof). The streaming of the media, or a portion thereof, may be performed using a further network connection opened between the server machine 110 (e.g., the first server) and the server machine 120 (e.g., the second server). For example, the stream module 220 may generate or initiate a further data stream that contains all or part of the media included in the data stream discussed above with respect to operation 640, and the stream module 220 may provide this further data stream to the server machine 120 via a further network connection (e.g., configured for media streaming or not) created for this purpose. Accordingly, some or all of the media from the client 130 may be provided to the server machine 120, which may be identified in the stream request and unmentioned in the connection request received in operation 610. Once received by the server machine 120, the media, or a portion thereof, may be stored by the server machine 120 (e.g., in the database 125).

As shown in FIG. 8, the method 700 may include one or more of operations 810, 830, 850, 852, and 854. Operation 810 may be performed as part of operation 610, in which the connection module 210 receives the connection request for creation of the network connection between the device 130 and the server machine 110 (e.g., the connection request that identifies the server machine 110 and fails to mention the server machine 120). In operation 810, the connection module 210 receives a URI that identifies the server machine 110. This URI (e.g., a first URI that identifies the first server) may be received within the connection request discussed above with respect to operation 610. According to some example embodiments, there is no URI within the connection request that identifies the server machine 120.

Operation 830 may be performed as part of operation 630, in which the stream module 220 receives the stream request for provision of media managed by the server machine 120 (e.g., the stream request that identifies the server machine 120 to the server machine 110). In operation 830, the stream module 220 receives a URI that identifies the server machine 120. This URI (e.g., a second URI that identifies the second server) may be received with the stream request discussed above with respect to operation 630. According to some example embodiments, this URI is provided to the server machine 110 for the first time since the creation of the network connection between the device 130 and the server machine 110 in operation 620. Since the stream request may be received at runtime (e.g., upload time), the URI of the server machine 120 may also be received at runtime within the stream request.

One or more of operations 850, 852, and 854 may be performed as part of operation 650, in which the stream module 220 provides at least a portion of the media for which streaming requested in the stream request to the server machine 120 (e.g., the second server). In operation 850, the stream module 220 receives the data stream initiated in operation 640. This data stream may be received from the device 130, via the connection opened in operation 620, and this data stream may include at least a portion of the media for which streaming is requested in the stream request received in operation 630.

In operation 852, the stream module 220 relays (e.g., sends, routes, reroutes, or copies) all or part of the data stream received in operation 850. The stream module 220 may relay all or part of this data stream to the server machine 120 (e.g., the second server). Accordingly, at least a portion of the media for which streaming is requested may be provided to the server machine 120.

In operation 854, the stream module 220 stores at the server machine 120 at least a portion of the media for which streaming is requested in the stream request received in operation 630. For example, the stream module 220 may request, command, or otherwise initiate storage of at least the portion of the media by the server machine 120, by the database 125, or any suitable combination thereof. As a result, at least some of the media for which streaming is requested in the stream request received in operation 630 may be provided to and stored at the server machine 120 (e.g., the second server), without identifying the server machine 120 (e.g., the second server) to the server machine 110 (e.g., the first server) until the stream request is received in operation 630.

According to various example embodiments, one or more of the methodologies described herein may facilitate a data provision service (e.g., a media streaming service) in which a first server machine is configured to provide various information (e.g., media or media content) stored elsewhere to a device. Moreover, one or more of the methodologies described herein may enable a second server machine to provide information to the device via a network connection created by the first server machine. Furthermore, one or more of the methodologies described herein may enable the device to request and use a single network connection to the first server machine, and then receive or transmit various data to or from the second server machine, which may remain unidentified to the first server machine until the device requests such communication of the various data (e.g., at runtime). Hence, one or more the methodologies described herein may facilitate enhanced data services in which the server machine that creates a network connection with a device is not necessarily the server machine from which data is retrieved and provided to the device. Likewise, one or more of the methodologies described herein may facilitate enhanced data services in which the server machine that creates a network connection with a device is not necessarily the server machine to which data is uploaded and stored from the device.

When these effects are considered in aggregate, one or more of the methodologies described herein may obviate a need for certain efforts or resources that otherwise would be involved in provision of such enhanced data services. Efforts expended by a user in configuring network connections and initiating communications of data streams may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 9:
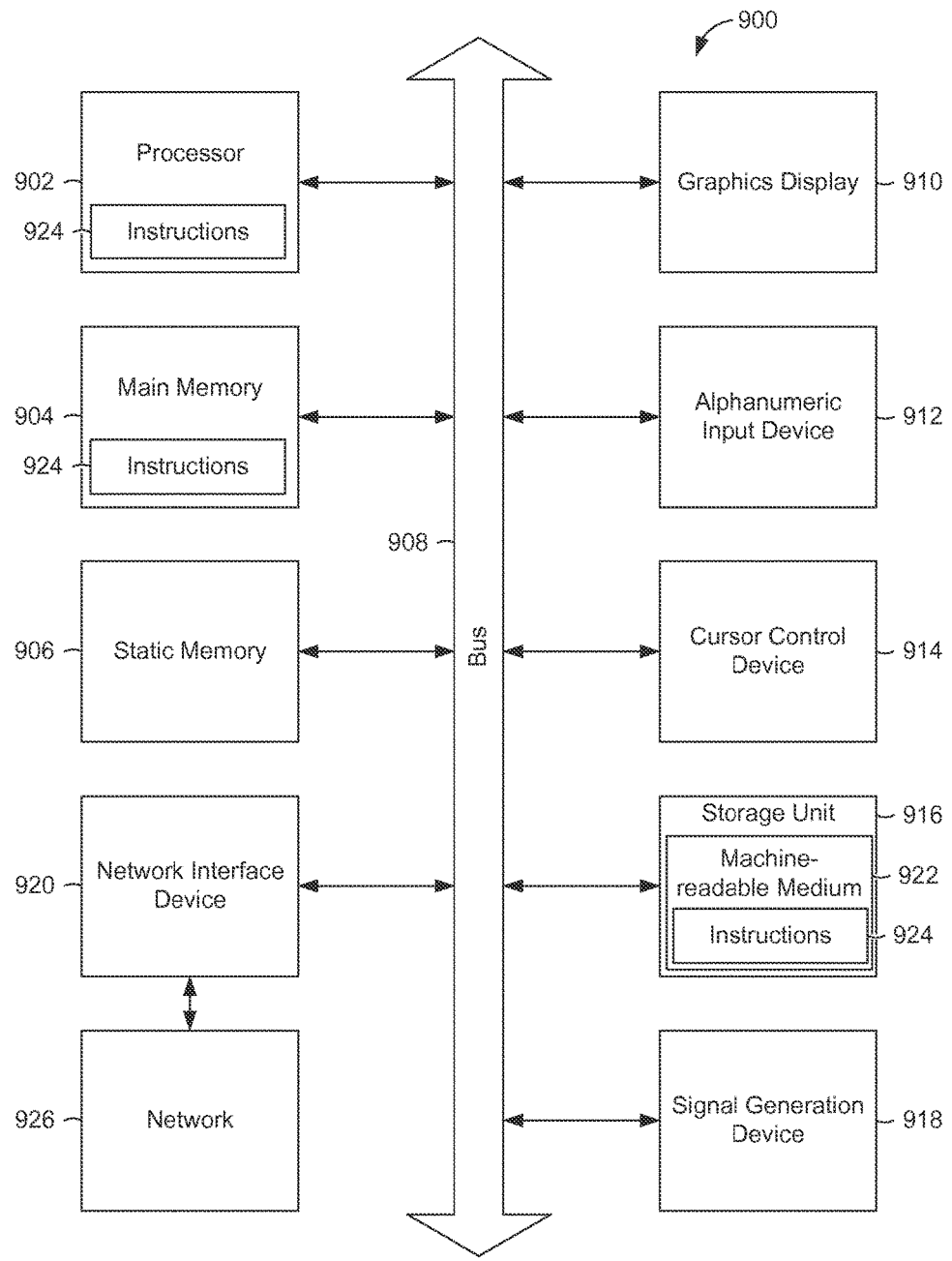
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically. FIG. 9 shows a diagrammatic representation of the machine 900 in the example form of a computer system and within which instructions 924 (e.g., software, a program, an application, an applet, an app, or other executable code) for causing the machine 900 to perform any one or more of the methodologies discussed herein may be executed. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 900 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a light emitting diode (LED) display, a liquid crystal display (LCD), a projector, or a cathode ray tube (CRT)). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 (e.g., network 190) via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 900), such that the instructions, when executed by one or more processors of the machine (e.g., processor 902), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals." or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A server system comprising:
   a first server comprising one or more processor devices and a memory that stores an enhanced media streaming engine that when executed by the one or more processors is configured to:
   receive, from a device, a connection request that identifies the first server and does not identify a second server;
   in response to receiving the connection request, create a network connection between the first server and the device, wherein the network connection is a communication session configured for streaming media content;
   after the network connection has been created between the first server and the device, receive, from the device, a stream request for a media content stored by the second server, the stream request is separate from the connection request and identifies the second server, wherein the second server is unknown to the server system until the enhanced media streaming engine receives the stream request, the second server does not include a media streaming engine;

in response to receiving the stream request, retrieve at least a portion of the media content from the second server; and in response to receiving the stream request, utilize the network connection between the first server and the device to stream the portion of the media content to the device.

2. The server system of claim 1, wherein the connection request includes a uniform resource identifier (URI) that identifies the first server, and the media content is absent from the first server.

3. A method executable by a first server, the method comprising:

receiving, from a device, a connection request that identifies the first server and does not identify a second server;

in response to receiving the connection request, creating a network connection between the device and the first server, wherein the network connection is a communication session configured for streaming media content;

after the network connection has been created between the first server and the device, receiving, from the device, a stream request that is separate from the connection request and requests that the first server provide the device with a media content stored by the second server, wherein the stream request identifies the second server, and the second server is unknown to the first server until the second server is identified by the stream request;

in response to receiving the stream request, retrieving at least a portion of the media content from the second server, wherein the second server does not include a media streaming engine, the retrieving being performed by a processor of the first server; and in response to receiving the stream request, utilizing the network connection between the first server and the device to stream the retrieved portion of the media content from the first server to the device.

4. The method of claim 3:
wherein the connection request includes a first uniform resource identifier that identifies the first server and the stream request includes a second uniform resource identifier that identifies the second server and is distinct from the first uniform resource identifier.

5. The method of claim 3, wherein:
receiving the stream request includes receiving a second uniform resource identifier that identifies the second server.

6. The method of claim 3, wherein:
the requested media content is absent from the first server.

7. The method of claim 3, wherein:
utilizing the network connection to stream the retrieved portion of the media content is performed by utilizing the first server to employ an enhanced media streaming engine.

8. A method executable by a first server, the method comprising:

receiving, from a device, a connection request that identifies the first server and does not identify a second server;

in response to receiving the connection request, creating a network connection between the device and the first server, wherein the network connection is a communication session configured for streaming media content;

receiving, from the device, a stream request that is separate from the connection request, the stream request identifies the second server, and requests that the first server receive the media content from the device and that the first server provides at least a portion of the media content to the second server, wherein the second server is unknown to the first server until the second server is identified by the stream request;

utilizing the network connection between the first server and the device to initiate a transmission of a data stream that includes at least a portion of the media content from the device to the first server, wherein initiating the transmission of the data stream is performed by one or more processors of the first server by utilizing an enhanced media streaming engine; and providing at least a portion of the data stream to the second server, wherein the second server does not include a media streaming engine.

9. The method of claim 8
wherein the connection request includes a first uniform resource identifier that identifies the first server and the stream request includes a second uniform resource identifier that identifies the second server and is distinct from a second the first uniform resource identifier.

10. The method of claim 8, wherein:
receiving the stream request includes receiving a second uniform resource identifier that identifies the second server.

11. The method of claim 8, wherein:
the first server is identified in the connection request.

12. The method of claim 8, wherein:
providing the portion of the data stream that includes at least the portion of the media content to the second server includes receiving the portion of the data stream from the device and relaying the portion of the data stream to the second server that is identified in the stream request.

13. The method of claim 8, wherein:
providing the portion of the data stream that includes at least the portion of the media content to the second server includes storing the portion of the media content at the second server that is identified in the stream request.

* * * * *